US009258511B2

(12) United States Patent
Blackburn et al.

(10) Patent No.: US 9,258,511 B2
(45) Date of Patent: *Feb. 9, 2016

(54) INDICIA OF CONTACT VIEWING ACTIVITY (71) Applicant: Microsoft Corporation, Redmond, WA (US)

(72) Inventors: Helen Blackburn, London (GB); David Dinka, London (GB); Gisela Gier, London (GB); Mark McLaughlin, Surrey (GB)

(73) Assignee: Skype, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 14/247,637

(22) Filed: Apr. 8, 2014

(65) Prior Publication Data

US 2014/0300825 A1 Oct. 9, 2014

Related U.S. Application Data (63) Continuation of application No. 12/843,569, filed on Jul. 26, 2010, now Pat. No. 8,711,200.

(30) Foreign Application Priority Data

Mar. 31, 2010 (GB) .................................. 1005454.2

(51) Int. Cl.
*H04N 7/14* (2006.01)
*H04N 5/44* (2011.01)
(Continued)

(52) U.S. Cl.
CPC .......... *H04N 5/4403* (2013.01); *H04L 65/4015* (2013.01); *H04L 65/4076* (2013.01);
(Continued)

(58) Field of Classification Search
CPC . H04N 2005/441; H04N 5/50; H04L 64/4015
USPC ......................................................... 348/191
See application file for complete search history.

(56) References Cited

U.S. PATENT DOCUMENTS 6,061,434 A 5/2000 Corbett
6,215,865 B1 4/2001 McCalmont
(Continued)

FOREIGN PATENT DOCUMENTS

CN 1893691 1/2007
CN 1956479 5/2007
(Continued)

OTHER PUBLICATIONS

"Bluetooth Profile", downloaded Jun. 28, 2010 from http:/ /en.wikipedia.org/w/index.php?title=Bluetooth_profile &oldid=330823199, accessed Dec. 10, 2009, 9 pages.
(Continued)

*Primary Examiner* — Creighton Smith
(74) *Attorney, Agent, or Firm* — Danielle Johnston-Holmes; Micky Minhas (57) ABSTRACT Embodiments include a television appliance configured to display a selected on-screen viewing activity, and a client application. The client application is configured to maintain a list of contacts and allow a user of the media appliance to establish communication events with contacts via a network interface and packet-based network. The client application is further configured to receive a machine-readable data item via the network interface and packet-based network from a television appliance of one or more of said contacts, the machine-readable data item indicating a current television channel being viewed by the respective contact. In at least some embodiments, the client application may control operation of said user's television appliance in relation to the contact's television appliance based on the data item.

20 Claims, 7 Drawing Sheets (51) Int. Cl.

| | | |
|---|---|---|
| H04N 5/445 | (2011.01) | |
| H04N 21/462 | (2011.01) | |
| H04N 21/4788 | (2011.01) | |
| H04L 29/06 | (2006.01) | |
| H04N 5/50 | (2006.01) | |

(52) U.S. Cl.
CPC ............... *H04N5/445* (2013.01); *H04N 5/50* (2013.01); *H04N 21/4622* (2013.01); *H04N 21/4788* (2013.01); *H04N 2005/441* (2013.01)

(56) References Cited

U.S. PATENT DOCUMENTS

| | | |
|---|---|---|
| 6,243,129 B1 | 6/2001 | Deierling |
| 6,449,284 B1 | 9/2002 | Hagirahim |
| 6,636,269 B1 | 10/2003 | Baldwin |
| 6,654,722 B1 | 11/2003 | Aldous et al. |
| 6,904,025 B1 | 6/2005 | Madour et al. |
| 6,930,661 B2 | 8/2005 | Uchida et al. |
| 6,985,961 B1 | 1/2006 | Ramsayer et al. |
| 7,039,205 B1 | 5/2006 | Carter et al. |
| 7,260,186 B2 | 8/2007 | Zhu et al. |
| 7,301,919 B2 | 11/2007 | Sundquist et al. |
| 7,526,253 B2 | 4/2009 | Fujioka |
| 7,673,001 B1 | 3/2010 | Battle et al. |
| 7,693,133 B2 | 4/2010 | Benco et al. |
| 7,716,283 B2 | 5/2010 | Thukral |
| 7,751,848 B2 | 7/2010 | Vishwanathan et al. |
| 7,908,630 B2 | 3/2011 | Crandall et al. |
| 7,920,690 B2 | 4/2011 | Sylvain |
| 7,995,721 B2 | 8/2011 | Gallick et al. |
| 8,223,747 B2 | 7/2012 | Yarlagadda et al. |
| 8,249,056 B2 | 8/2012 | Ku |
| 8,369,498 B2 | 2/2013 | Dinka et al. |
| 8,407,749 B2 | 3/2013 | McLaughlin et al. |
| 8,413,199 B2 | 4/2013 | Laasik et al. |
| 8,421,839 B2 | 4/2013 | Kert |
| 8,451,315 B2 | 5/2013 | Lee |
| 8,520,050 B2 | 8/2013 | Blackburn et al. |
| 8,711,200 B2 | 4/2014 | Blackburn et al. |
| 8,804,925 B2 | 8/2014 | Kaal et al. |
| 8,885,601 B2 | 11/2014 | Blackburn et al. |
| 9,019,336 B2 | 4/2015 | Lindblom et al. |
| 2002/0034166 A1 | 3/2002 | Barany et al. |
| 2003/0023730 A1 | 1/2003 | Wengrovitz et al. |
| 2003/0058805 A1 | 3/2003 | Meyerson et al. |
| 2003/0177099 A1 | 9/2003 | Gallant et al. |
| 2004/0083297 A1 | 4/2004 | Gazzetta et al. |
| 2004/0194146 A1 | 9/2004 | Bates et al. |
| 2004/0213201 A1 | 10/2004 | Osterlund |
| 2005/0009577 A1 | 1/2005 | Kangas et al. |
| 2005/0021872 A1 | 1/2005 | Poustchi et al. |
| 2005/0034079 A1 | 2/2005 | Gunasekar et al. |
| 2005/0041793 A1 | 2/2005 | Fulton et al. |
| 2005/0122963 A1 | 6/2005 | Jeon et al. |
| 2005/0197061 A1 | 9/2005 | Hundal |
| 2005/0268334 A1 | 12/2005 | Hesselink et al. |
| 2005/0278778 A1 | 12/2005 | D'Agostino et al. |
| 2006/0013194 A1 | 1/2006 | Baumann et al. |
| 2006/0034327 A1 | 2/2006 | Tanimoto |
| 2006/0045070 A1 | 3/2006 | Fotta et al. |
| 2006/0093998 A1 | 5/2006 | Vertegaal |
| 2006/0146804 A1 | 7/2006 | Ozaki |
| 2006/0176834 A1 | 8/2006 | Dickerson et al. |
| 2006/0221174 A1 | 10/2006 | Yang et al. |
| 2007/0070188 A1 | 3/2007 | Shyu |
| 2007/0091833 A1 | 4/2007 | Bauchot et al. |
| 2007/0115348 A1 | 5/2007 | Eppel et al. |
| 2007/0265091 A1 | 11/2007 | Aguilar, Jr. et al. |
| 2007/0280200 A1 | 12/2007 | Patel |
| 2007/0286202 A1 | 12/2007 | Dos Remedios et al. |
| 2008/0062962 A1 | 3/2008 | Luck et al. |
| 2008/0069069 A1 | 3/2008 | Schessel et al. |
| 2008/0069087 A1 | 3/2008 | Igoe |
| 2008/0075240 A1 | 3/2008 | Ramanathan et al. |
| 2008/0081698 A1 | 4/2008 | Wormald et al. |
| 2008/0091682 A1 | 4/2008 | Lim |
| 2008/0094371 A1 | 4/2008 | Forstall et al. |
| 2008/0157998 A1 | 7/2008 | Zuo et al. |
| 2008/0182546 A1 | 7/2008 | Wang et al. |
| 2008/0235587 A1 | 9/2008 | Heie et al. |
| 2008/0239995 A1 | 10/2008 | Lee et al. |
| 2008/0301737 A1* | 12/2008 | Hjelmeland Almas et al. ... 725/61 |
| 2009/0017792 A1 | 1/2009 | Matsumoto et al. |
| 2009/0046839 A1 | 2/2009 | Chow et al. |
| 2009/0049190 A1 | 2/2009 | Jiang et al. |
| 2009/0094684 A1 | 4/2009 | Chinnusamy et al. |
| 2009/0136016 A1 | 5/2009 | Gornoi et al. |
| 2009/0138697 A1 | 5/2009 | Kim |
| 2009/0168756 A1 | 7/2009 | Kurapati et al. |
| 2009/0172170 A1 | 7/2009 | Rey |
| 2009/0175509 A1 | 7/2009 | Gonion et al. |
| 2009/0177601 A1 | 7/2009 | Huang et al. |
| 2009/0185792 A1 | 7/2009 | Braunstein et al. |
| 2009/0225750 A1 | 9/2009 | Hawkins |
| 2009/0232084 A1 | 9/2009 | Li et al. |
| 2009/0238170 A1 | 9/2009 | Rajan et al. |
| 2009/0254339 A1 | 10/2009 | Seguin |
| 2009/0271820 A1 | 10/2009 | Choi et al. |
| 2009/0280789 A1 | 11/2009 | Takumo et al. |
| 2010/0008523 A1 | 1/2010 | Demuynck et al. |
| 2010/0046731 A1 | 2/2010 | Gisby et al. |
| 2010/0060715 A1 | 3/2010 | Laasik et al. |
| 2010/0254670 A1 | 10/2010 | Amsterdam et al. |
| 2011/0021200 A1 | 1/2011 | Yi et al. |
| 2011/0047282 A1 | 2/2011 | Denman et al. |
| 2011/0109715 A1 | 5/2011 | Jing et al. |
| 2011/0110504 A1 | 5/2011 | Kaal et al. |
| 2011/0119490 A1 | 5/2011 | Kaal et al. |
| 2011/0141925 A1 | 6/2011 | Velenko et al. |
| 2011/0177801 A1 | 7/2011 | Heit et al. |
| 2011/0222466 A1 | 9/2011 | Pance et al. |
| 2011/0242266 A1 | 10/2011 | Blackburn et al. |
| 2011/0242268 A1 | 10/2011 | Kim et al. |
| 2011/0242270 A1 | 10/2011 | Dinka |
| 2011/0243125 A1 | 10/2011 | Kaal et al. |
| 2011/0243141 A1 | 10/2011 | Blackburn et al. |
| 2011/0244955 A1 | 10/2011 | Dinka et al. |
| 2011/0261143 A1 | 10/2011 | Ponsford |
| 2012/0087367 A1 | 4/2012 | Anikin |
| 2012/0105475 A1 | 5/2012 | Tseng |
| 2012/0169831 A1 | 7/2012 | Nietfeld et al. |
| 2012/0182988 A1 | 7/2012 | Brenes |
| 2012/0206553 A1 | 8/2012 | MacDonald |
| 2012/0207147 A1 | 8/2012 | MacDonald |
| 2013/0136089 A1 | 5/2013 | Gillett et al. |
| 2013/0169736 A1 | 7/2013 | Lindblom |
| 2013/0230023 A1 | 9/2013 | Gray et al. |
| 2014/0112333 A1 | 4/2014 | Oberle et al. |

FOREIGN PATENT DOCUMENTS

| | | |
|---|---|---|
| CN | 101212556 | 7/2008 |
| CN | 102257791 | 11/2011 |
| EP | 1475939 | 11/2004 |
| EP | 1592198 | 11/2005 |
| EP | 1816843 | 8/2007 |
| EP | 1909467 | 4/2008 |
| EP | 2063612 | 5/2009 |
| EP | 2088735 | 8/2009 |
| EP | 2114062 | 11/2009 |
| EP | 2056601 | 8/2011 |
| GB | 2479180 | 10/2011 |
| JP | 200586765 | 3/2005 |
| WO | WO-2004066604 | 8/2004 |
| WO | WO 2005/009019 | 1/2005 |
| WO | WO-2005008524 | 1/2005 |
| WO | WO-2005009019 | 1/2005 |
| WO | WO-2006051492 | 5/2006 |
| WO | WO-2006058036 | 6/2006 |
| WO | WO-2007023208 | 3/2007 |
| WO | WO-2007137485 | 6/2007 |
| WO | WO-2007118250 | 10/2007 |
| WO | WO-2007126652 | 11/2007 |

(56) References Cited

FOREIGN PATENT DOCUMENTS

| WO | WO-2008015369 | 2/2008 |
|---|---|---|
| WO | WO-2009115048 | 9/2009 |
| WO | WO-2010026187 | 3/2010 |
| WO | WO-2010026188 | 3/2010 |
| WO | WO-2010026189 | 3/2010 |
| WO | WO-2010026190 | 3/2010 |
| WO | WO-2010026191 | 3/2010 |
| WO | WO-2010026194 | 3/2010 |
| WO | WO-2010026196 | 3/2010 |
| WO | WO-2011120948 | 10/2011 |
| WO | WO-2011120991 | 10/2011 |
| WO | WO-2011120992 | 10/2011 |
| WO | WO-2011121006 | 10/2011 |

OTHER PUBLICATIONS

"Corrected Notice of Allowance", U.S. Appl. No. 12/843,569, Feb. 21, 2014, 2 pages.
"Extended European Search Report", EP Application No. 12199326.5, Apr. 3, 2013, 6 pages.
"Femtocell", downloaded Jun. 28, 2010 from http://en.wikipedia.org/w/iindex.php?title=Femtocell&oldid=330068819, accessed Dec. 10, 2009, Dec. 6, 2009, 8 pages.
"Final Office Action", U.S. Appl. No. 12/843,293, Jun. 11, 2013, 9 pages.
"Final Office Action", U.S. Appl. No. 12/843,293, Apr. 9, 2014, 10 pages.
"Final Office Action", U.S. Appl. No. 12/843,527, Oct. 24, 2013, 10 pages.
"Final Office Action", U.S. Appl. No. 12/843,543, Aug. 3, 2012, 8 pages.
"Final Office Action", U.S. Appl. No. 12/843,569, Oct. 9, 2012, 20 pages.
"International Search Report and Written Opinion", Application No. PCT/US2012/072025, Mar. 26, 2013, 12 pages.
"International Search Report and Written Opinion", Application No. PCT/EP2011/054781, May 23, 2011, 13 pages.
"International Search Report and Written Opinion", Application No. PCT/EP2011/054864, May 31, 2011, 13 pages.
"International Search Report and Written Opinion", Application No. PCT/EP2011/054879, Jun. 24, 2011, 13 pages.
"International Search Report and Written Opinion", Application No. PCT/EP2011/054862, Jun. 27, 2011, 17 pages.
"International Search Report and Written Opinion", Application No. PCT/EP2011/054881, Jul. 25, 2011, 18 pages.
"IP-DECT", downloaded Jun. 28, 2010 from http://en.wikipedia.org/w/index.phptitle=IPDECT&oldid=322769463, accessed Dec. 10, 2009, Oct. 29, 2009, 1 page.
"MagicJack Harnesses Femtocell for VoIP", downloaded Jun. 28, 2010 from http://.pcworld.com/article/186308/magicjack_harnesses_femtocell_for_voip.html, dated Jan. 8, 2010, accessed Feb. 4, 2010, 7 pages.
"Non-Final Office Action", U.S. Appl. No. 12/290,232, Jun. 11, 2012, 16 pages.
"Non-Final Office Action", U.S. Appl. No. 12/843,293, Jan. 30, 2013, 9 pages.
"Non-Final Office Action", U.S. Appl. No. 12/843,293, Sep. 23, 2013, 9 pages.
"Non-Final Office Action", U.S. Appl. No. 12/843,527, Mar. 14, 2014, 14 pages.
"Non-Final Office Action", U.S. Appl. No. 12/843,527, Mar. 29, 2013, 11 pages.
"Non-Final Office Action", U.S. Appl. No. 12/843,543, May 29, 2012, 9 pages.
"Non-Final Office Action", U.S. Appl. No. 12/843,569, Apr. 19, 2013, 23 pages.
"Non-Final Office Action", U.S. Appl. No. 12/843,569, Apr. 4, 2012, 13 pages.
"Notice of Allowance", U.S. Appl. No. 12/843,543, Oct. 15, 2012, 6 pages.
"Notice of Allowance", U.S. Appl. No. 12/843,569, Dec. 11, 2013, 11 pages.
"Search Report", GB Application No. 1005462.5, Jul. 28, 2011, 2 pages.
"Voice over IP (VOIP) Phone System Provider, Philadelphia Pa", Retrieved from <http://www.expertta.com/philadelphia-pa-voice-over-ip-system-provider> on Dec. 11, 2012, Jan. 17, 2010, 2 pages.
Mock, et al., "A Voice over IP Solution for Mobile Radio Interoperability", IEEE 56th Vehicular Technology Conference, Retrieved from <http://ieeexplore.ieee.org/stamp/stamp.jsp?tp=&arnumber=1040433>,Sep. 24, 2002, 4 pages.
Oprea, et al., "Securing a Remote Terminal Application with a Mobile Trusted Device", 20th Annual Conference on Computer Security Applications, Retrieved from <http://www.rsa.com/rsalabs/staff/bios/aoprea/publications/acsac.pdf>,Dec. 6, 2004, 10 pages.
"Advisory Action", U.S. Appl. No. 12/290,232, Jan. 29, 2013, 3 Pages.
"Final Office Action", U.S. Appl. No. 12/290,232, Jul. 16, 2014, 22 pages.
"Final Office Action", U.S. Appl. No. 12/290,232, Dec. 6, 2012, 18 pages.
"Final Office Action", U.S. Appl. No. 12/824,681, Mar. 15, 2013, 14 pages.
"Final Office Action", U.S. Appl. No. 12/824,681, Jul. 2, 2014, 31 pages.
"Final Office Action", U.S. Appl. No. 12/941,585, Nov. 18, 2013, 10 pages.
"Final Office Action", U.S. Appl. No. 13/340,508, Jun. 24, 2014, 7 pages.
"Foreign Notice of Allowance", EP Application No. 11712232.5, Feb. 4, 2014, 6 pages.
"Foreign Notice of Allowance", EP Application No. 11808879.8, Aug. 20, 2014, 7 pages.
"Foreign Office Action", CN Application No. 201180016940.4, Apr. 22, 2014, 16 pages.
"Foreign Office Action", EP Application No. 11712232.5, Jun. 20, 2013, 4 pages.
"Foreign Office Action", EP Application No. 11713480.9, Jun. 17, 2013, 4 pages.
"Foreign Office Action", EP Application No. 11818918.2, Apr. 11, 2014, 6 pages.
"International Search Report and Written Opinion", Application No. PCT/EP2010/066562, Feb. 23, 2011, 11 pages.
"International Search Report and Written Opinion", Application No. PCT/EP2011/074302, Mar. 6, 2012, 11 pages.
"International Search Report and Written Opinion", Application No. PCT/EP2011/074303, May 29, 2012, 11 pages.
"International Search Report and Written Opinion", Application No. PCT/EP2010/066561, Sep. 26, 2011, 13 pages.
"International Search Report", Application No. PCT/EP2011/074304, Feb. 7, 2012, 3 pages.
"Non-Final Office Action", U.S. Appl. No. 12/290,232, Jan. 16, 2014, 21 pages.
"Non-Final Office Action", U.S. Appl. No. 12/824,681, Oct. 10, 2012, 13 pages.
"Non-Final Office Action", U.S. Appl. No. 12/824,681, Oct. 15, 2013, 27 pages.
"Non-Final Office Action", U.S. Appl. No. 12/941,585, Jun. 12, 2013, 9 pages.
"Non-Final Office Action", U.S. Appl. No. 12/941,585, Dec. 31, 2012, 11 pages.
"Non-Final Office Action", U.S. Appl. No. 13/340,492, Oct. 3, 2014, 14 pages.
"Non-Final Office Action", U.S. Appl. No. 13/340,508, Mar. 12, 2014, 9 pages.
"Non-Final Office Action", U.S. Appl. No. 13/340,524, Sep. 2, 2014, 10 pages.
"Non-Final Office Action",U.S. Appl. No. 13/710,041, Jul. 8, 2014, 11 pages.
"Notice of Allowance", U.S. Appl. No. 12/941,585, Mar. 31, 2014, 7 pages.
"Notice of Allowance", U.S. Appl. No. 13/340,508, Sep. 30, 2014, 6 pages.

(56) References Cited

OTHER PUBLICATIONS

"Search Report", GB Application No. 0919591.8, Feb. 23, 2011, 2 pages.

"Search Report", GB Application No. 0919592.6, Feb. 24, 2011, 1 page.

"Summons to Attend Oral Proceedings", EP Application No. 11713480.9, Aug. 6, 2014, 4 pages.

Saint-Andre, "Streaming XML with Jabber/XMPP", IEEE Internet Computing, vol. 9, No. 5, Sep. 1, 2005, pp. 82-89.

Sparks, "The Session Initiation Protocol (SIP) Refer Method", Retrieved from <https://datatracker.ietf.org/doc/rfc3515/> on Jan. 11, 2014, Apr. 2003, 20 pages.

"Foreign Office Action", CN Application No. 201180017018.7, Oct. 10, 2014, 16 pages.

"Notice of Allowance", U.S. Appl. No. 13/710,041, Dec. 8, 2014, 4 pages.

"Foreign Office Action", EP Application No. 11712231.7, Nov. 6, 2014, 5 pages.

"Decision to Refuse", EP Application No. 11713480.9, Apr. 7, 2015, 10 pages.

"Foreign Office Action", CN Application No. 201180016975.8, Mar. 20, 2015, 10 pages.

"Foreign Office Action", CN Application No. 201210582330.7, Nov. 15, 2014, 16 pages.

"Foreign Office Action", CN Application No. 201180016951.2, May 22, 2014, 19 pages.

"Foreign Office Action", CN Application No. 201180016975.8, Jun. 27, 2014, 15 pages.

"Notice of Allowance", U.S. Appl. No. 12/843,527, Jul. 9, 2014, 11 pages.

"Foreign Office Action", CN Application No. 201180017018.7, Aug. 20, 2015, 10 pages.

\* cited by examiner

INDICIA OF CONTACT VIEWING ACTIVITY

RELATED APPLICATION

This application is a continuation of and claims priority under 35 U.S.C. §120 to U.S. patent application Ser. No. 12/843,569, filed on Jul. 26, 2010 and titled "Television Apparatus", which in turn claims priority to G.B. Patent Application Serial No. 1005454.2, filed on Mar. 31, 2010 and titled "Television Apparatus", the disclosures of which are incorporated by reference herein in their entirety.

FIELD OF THE INVENTION

The present invention relates to a household media appliance such as television set or set-top box having an embedded processing apparatus for conducting voice or video calls via a packet-based network.

BACKGROUND

Some communication systems allow the user of a terminal, such as a personal computer, to conduct voice or video calls over a packet-based computer network such as the Internet. Such communication systems include voice or video over internet protocol (VoIP) systems. These systems are beneficial to the user as they are often of significantly lower cost than conventional fixed line or mobile networks. This may particularly be the case for long-distance communication. To use a VoIP system, the user installs and executes client software on their terminal. The client software sets up the VoIP connections as well as providing other functions such as registration and authentication. In addition to voice communication, the client may also set up connections for other communication media such as instant messaging ("IM"), SMS messaging, file transfer and voicemail.

One type of communication system for packet-based communication uses peer-to-peer ("P2P") topology. To enable access to a peer-to-peer system, a user executes P2P client software supplied by a P2P software provider on their terminal, and registers with the P2P system. When the user registers with the P2P system, the client software is provided with a digital certificate from a server. This may be referred to as a "user identity certificate" (UIC). Once the client software has been provided with the certificate, then calls or other communication connections can subsequently be set up and routed between end-users ("peers") of the P2P system without the further use of a server in the call set-up. Instead, the client looks up the required IP addresses from information distributed amongst the P2P client software on other end-users' terminals within the P2P system. That is, the address look-up list is distributed amongst the peers themselves. Once the IP address of a callee's terminal has thus been determined, the caller's P2P client software then exchanges UIC certificates with the callee's P2P client software. The exchange of these digital certificates between users provides proof of the users' identities and that they are suitably authorized and authenticated in the P2P system. Therefore the presentation of digital certificates provides trust in the identity of the users.

It is therefore a characteristic of peer-to-peer communication that, once registered, the users can set up their own communication routes through the P2P system in at least a partially decentralized manner based on distributed address look-up and/or the exchange of one or more digital certificates, without using a server for those purposes. Further details of an example P2P system are disclosed in WO 2005/008524 and WO 2005/009019.

VoIP or other packet-based communications can also be implemented using non-P2P systems that do use centralized call set-up and/or authorization, e.g. via server.

A problem with packet-based communications is that their accessibility to users is limited. In particular, such communications are most commonly accessed using a client application installed on personal computer. This has a disadvantage in that its use may be limited, since personal computers are often not located in a place where the user is either familiar of comfortable with making phone calls. For example, a personal computer is often located in a study which for many users is not the most natural or comfortable environment for making personal calls.

Whilst packet-based communication systems can also be accessed via certain mobile devices, these generally do not have sufficient processing resources, bandwidth or display screens to offer a full range of features, such as video calling.

It would therefore be desirable to make packet-based communications more accessible to users. One way to do this would be to run a packet-based communication client on a processor embedded in a familiar household media appliance like a television set or set-top box for plugging into a television. Embedded in this context means within the casing of the appliance. The ability to integrate an embedded processor into a television set or set-top box is known, and indeed many modern televisions and boxes already contain a processor for performing at least some of the digital signal processing required to decode and output viewable television signals to the screen.

SUMMARY

According to one aspect of the present invention, there is provided a television appliance comprising: a television receiver for receiving television signals and outputting the television signal of a selected channel to a screen; a network interface for accessing a packet-based network; a memory storing a communication client application; and processing apparatus coupled to the memory, network interface and video apparatus, and arranged to execute the communication client application; wherein the client application is configured to maintain a list of contacts and allow a user of the media appliance to establish communication events with the contacts via the network interface and packet-based network; and the client application is further configured so as to: receive a machine-readable data item via the network interface and packet-based network from a television appliance of one or more of said contacts, the machine-readable data item indicating a current television channel being viewed by the respective contact; and to process the machine-readable data item so as to control operation of said user's television appliance in relation to the contact's television appliance based on the processed data item.

By exchanging data on currently viewed television channels or programmes between contacts, this allows the users to have a shared experience in real time. For example, the client may be configured to detect when the user is viewing the same channel or programme as one or more of their contacts, and generate an on-screen control enabling a voice or video call to be established based on that detection. In another example, the client may detect that contacts are watching different channels or programmes, and generate an on-screen control allowing the user to switch to one of their contacts' channels.

So in particularly preferred embodiments, the client application may be configured to process the machine-readable data item so as to generate an on-screen control comprising human-readable information relating to the channel of the respective contact for output to said screen, and to establish a communication event with the respective contact in dependence on a user response received via said on-screen control.

The client application may be configured to process the machine-readable data item so as to compare the current television channel being viewed by the respective contact to a current television channel being viewed by said user, and control operation of said user's media appliance in relation to the contact's television appliance based on the comparison.

The client application may be configured to: receive a plurality of said machine-readable data items from media appliances of a plurality of said contacts; and process the machine-readable data items so as to detect which of said contacts are viewing a same channel as said user, and enable a communication event to be established with one or more of the contacts viewing the same channel based on said detection.

The communication client may be configured to allow a user of the media appliance to establish voice or video calls or instant messaging events with the contacts via the network interface and packet-based network, said event being a voice or video call or an instant messaging event.

The client application may be configured to receive channel or programme identity data via said television receiver, and perform said processing by mapping the machine-readable data item to the programme or channel identity.

The client application may be configured to receive programme timing data via said television receiver, and perform said processing by mapping the machine-readable data item to the programme timing data.

The client application may be configured to process the machine-readable data item so as to generate an on-screen control for switching to the respective contact's television channel, and to operate the television receiver to switch to the respective contact's channel in dependence on a user input to said control.

Said television receiver may comprise a television broadcast receiver for receiving broadcast television signals and outputting the television signal of a selected broadcast channel to the screen, and the machine-readable data item may indicate a current television broadcast channel being viewed by the respective contact.

According to another aspect of the present invention, there is provided a media appliance comprising: video apparatus for outputting signals to a screen; a control device allowing a user to control the output of signals from the video apparatus to the screen, thereby selecting an on-screen viewing activity; a network interface for accessing a packet-based network; a memory storing a communication client application; and processing apparatus, coupled to the memory, network interface and video apparatus, and arranged to execute the communication client application; wherein the client application is configured to maintain a list of contacts and allow a user of the media appliance to establish communication events with the contacts via the network interface and packet-based network; and the client application is further configured so as when executed to: generate a machine-readable data item indicating the current selected on-screen viewing activity of the media appliance, and transmit said machine readable data item to a plurality of said contacts via the network interface and packet-based network.

According to another aspect of the present invention, there is provided a method of operating a television appliance comprising a television receiver for receiving television signals and outputting the television signal of a selected channel to a screen, the method comprising: executing a communication client application on an embedded processing apparatus of the television appliance, wherein the client application is configured to maintain a list of contacts and allow a user of the media appliance to establish communication events with the contacts via a network interface to a packet-based network; and receiving a machine-readable data item via the network interface and packet-based network from a television appliance of one or more of said contacts, the machine-readable data item indicating a current television channel being viewed by the respective contact; wherein the execution of the communication client application comprises processing the machine-readable data item so as to control operation of said user's television appliance in relation to the contact's television appliance based on the processed data item.

In embodiments, there may be provided a method comprising steps in accordance with any described appliance.

According to another aspect of the present invention, there is provided a communication client application for operating a television appliance comprising a television receiver for receiving television signals and outputting the television signal of a selected channel to a screen, the communication client application comprising code embodied on a computer-readable medium and configured so as when executed on a processing apparatus of the television appliance to: maintain a list of contacts and enable a user of the media appliance to establish communication events with the contacts via a network interface to a packet-based network; receive a machine-readable data item via the network interface and packet-based network from a television appliance of one or more of said contacts, the machine-readable data item indicating a current television channel being viewed by the respective contact; and process the machine-readable data item so as to control operation of said user's television appliance in relation to the contact's television appliance based on the processed data item.

In embodiments, there may be provided a communication client application configured in accordance with any described appliance.

BRIEF DESCRIPTION OF THE DRAWINGS

For a better understanding of the present invention and to show how it may be put into effect, reference is made by way of example to the accompanying drawings in which.

DETAILED DESCRIPTION OF PREFERRED EMBODIMENTS

Figure 1:
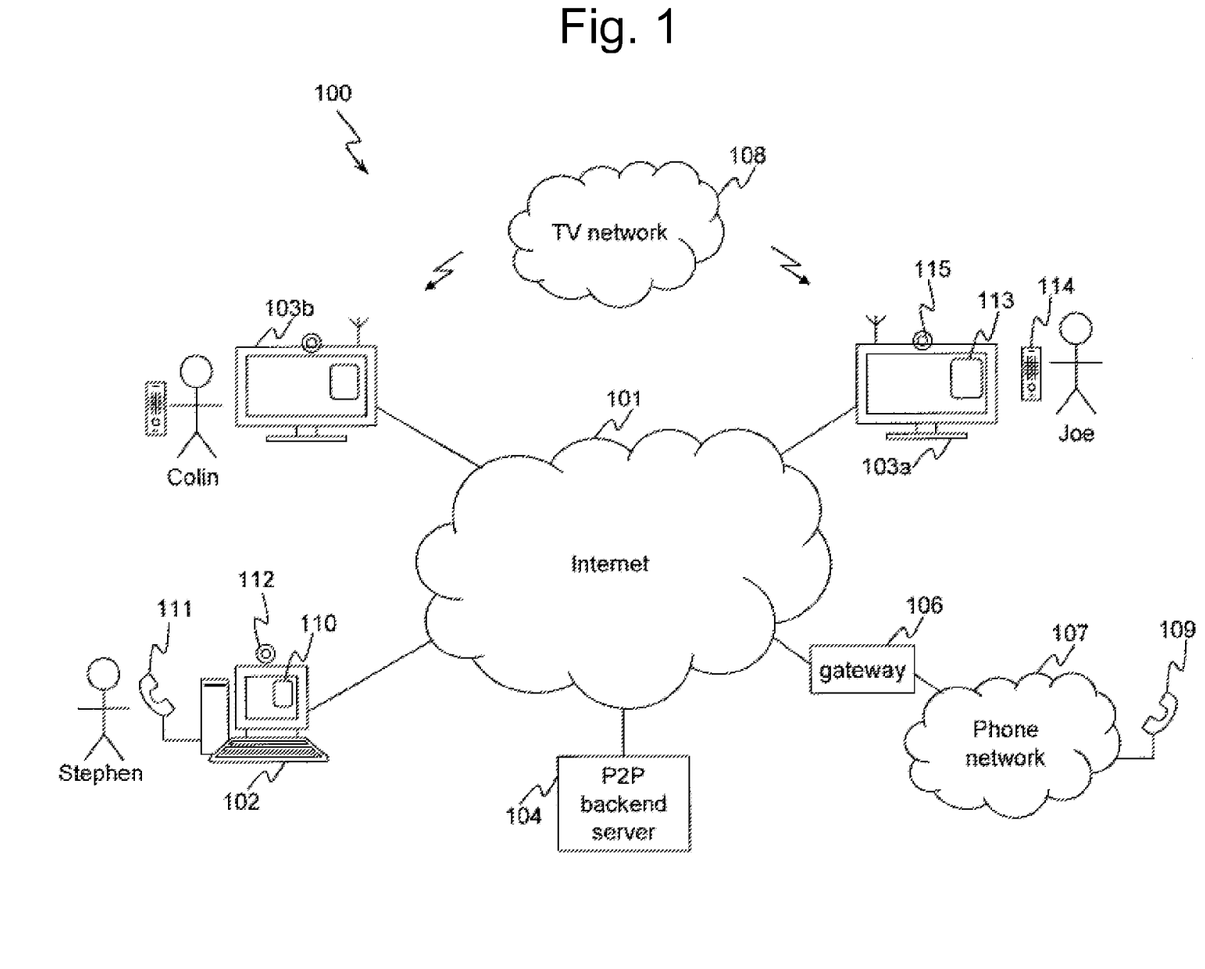
FIG. 1 is a schematic representation of a communication system.

FIG. 1 shows a communication system 100 comprising a packet-based network 101 such as the Internet; and further comprising a separate television broadcasting network 108 such as a terrestrial, satellite or cable television network. A plurality of computer terminals 102 are shown coupled to the Internet 101, each comprising a network interface for communicating over the Internet. A plurality of television sets 103 are also shown coupled to the Internet 101, each of which also comprises a network interface for communicating over the Internet. In addition to the network interface, each television set 103 further comprises a television receiver for receiving analogue and/or digital television signals which are broadcast over the television network 108. Alternatively or additionally, a television set 103 could be arranged to receive packet-based television signals over the Internet 101 or other such packet-based network. However, broadcast television is still popular at the time of writing and so in preferred embodiments the television set 103 will comprise a television receiver for receiving broadcasts at least.

The difference between a broadcast and a communication made over a packet-based network is that broadcast signals are transmitted indiscriminately, without transmitting to selected destination devices and regardless of whether the end user has selected to receive the signal (although a decryption key or such like may still be required so that only authorized users can derive meaningful information from the television signal for viewing). Packet-based communications on the other hand are point-to-point, with an address of the intended destination device being included in the packets. In the case of packet-based television signals transmitted over the Internet, these are still point-to-multipoint communications rather than a broadcast.

Each computer terminal 102 is installed with a communication client application 110. Each computer terminal 102 also comprises an audio transceiver 111 comprising a speaker and microphone, e.g. in the form of a headset or handset, or a built-in speaker and microphone. Most computer terminals 102 preferably also comprise a webcam 112. Furthermore, each television set 103 comprises an embedded processor and memory installed with a version of the communication client application 113 specially adapted for running on a television set. Each television set 103 also comprises a web cam 115 and an audio transceiver with speaker and microphone, or is connected or communicable with such components. In a particularly preferred embodiment an audio transceiver is provided in a remote control unit 114 of the television 103, discussed shortly.

The communication client applications 110 and 113 are preferably peer-to-peer clients for setting-up and conducting VoIP calls according to peer-to-peer principles as discussed above. To that end, a peer-to-peer backend server 104 is coupled to the Internet 101 for receiving registration requests from the client applications 111 and 113. The back-end server 104 is arranged to distribute UIC certificates to the respective client applications 111 and 113 running on the computer terminals 102 and television sets 103 in response to the registration requests. Once registered and thus in possession of a UIC certificate, the client applications 111 and/or 113 can look-up one another's addresses, exchange and authenticate one another's certificates, and thus establish a voice or video call over the Internet 101. It will be appreciated however that other kinds of communication client could alternatively be used, e.g. based on centralized server-based call set-up.

In addition, the communication system 100 may comprise a telephone network 107 such as a circuit-switched network, and a gateway 106 connecting between the Internet 101 and the telephone network 107. A gateway version of the client application is arranged to run on the gateway 106, and a communication client application 110 or 113 running on a computer terminal 102 or television set 103 is thus able to establish a call with a dedicated phone unit 109 of the telephone network 107. This is achieved by establishing a connection with the client on the gateway 106 using peer-to-peer call set-up and then supplying the relevant telephone number to the gateway 107 (effectively the user's client 110 or 113 sees the gateway 106 as a peer). The phone network 107 may for example comprise a fixed-line network ("landline") and/or a mobile cellular network.

Figure 2:
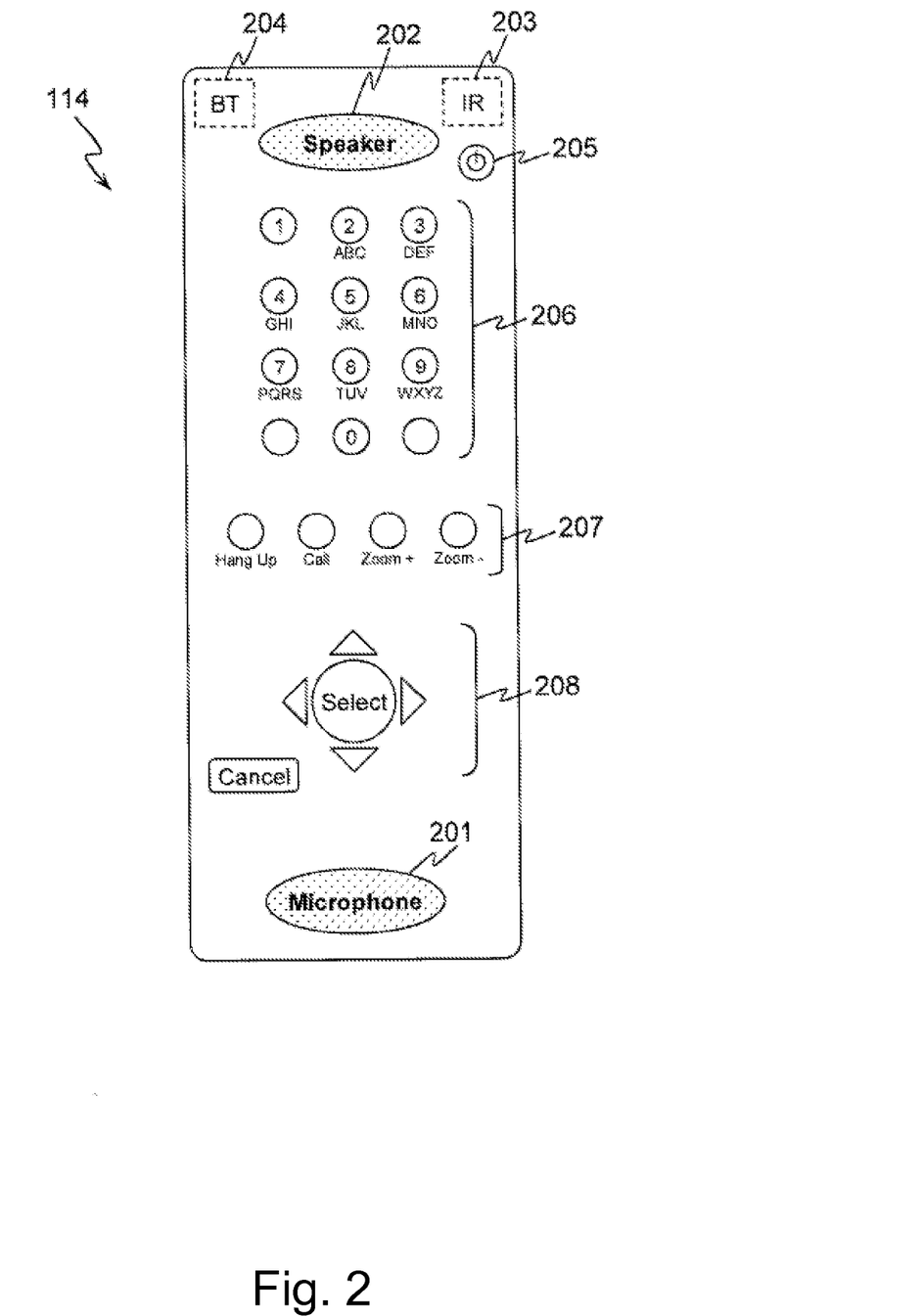
FIG. 2 is a schematic representation of a remote control unit.

Each television set 103 has an associated remote control unit 114, an example of which is illustrated in FIG. 2.

As shown in FIG. 2, the remote control unit (or just "remote control") comprises a microphone 201, speaker 202, a first remote interface in the form of an infrared (IR) transmitter 203, and a second remote interface in the form of a short-range RF interface 204 such as a Bluetooth interface. The microphone 201 and speaker 202 are operatively coupled to the Bluetooth interface 204. The remote control 114 is thus arranged to communicate voice signals from the microphone 201 to the television 103 via the Bluetooth interface 204, and to receive voice signals from the television 103 via the Bluetooth interface 204 for playing out of the speaker 202.

The remote control 114 further comprises a plurality of buttons operatively coupled to the infrared transmitter 203, arranged so as to allow the user to control the television 103 via the infrared transmitter 203. The buttons comprise a "standby" button 205 for setting the television into a low-power mode. The buttons further comprise numerical or alphanumeric buttons 206 for changing channel or supplying other numerical or alphanumerical data to the television 103; function buttons 208 for controlling various functions of the television 103, e.g. for controlling a cursor and/or menu system; and optionally dedicated calling buttons 207 for performing specific dedicated operations relating to the calling functionality of the client application 113, e.g. "call", "hang up", or buttons for zooming in and out during a video call.

Figure 3A:
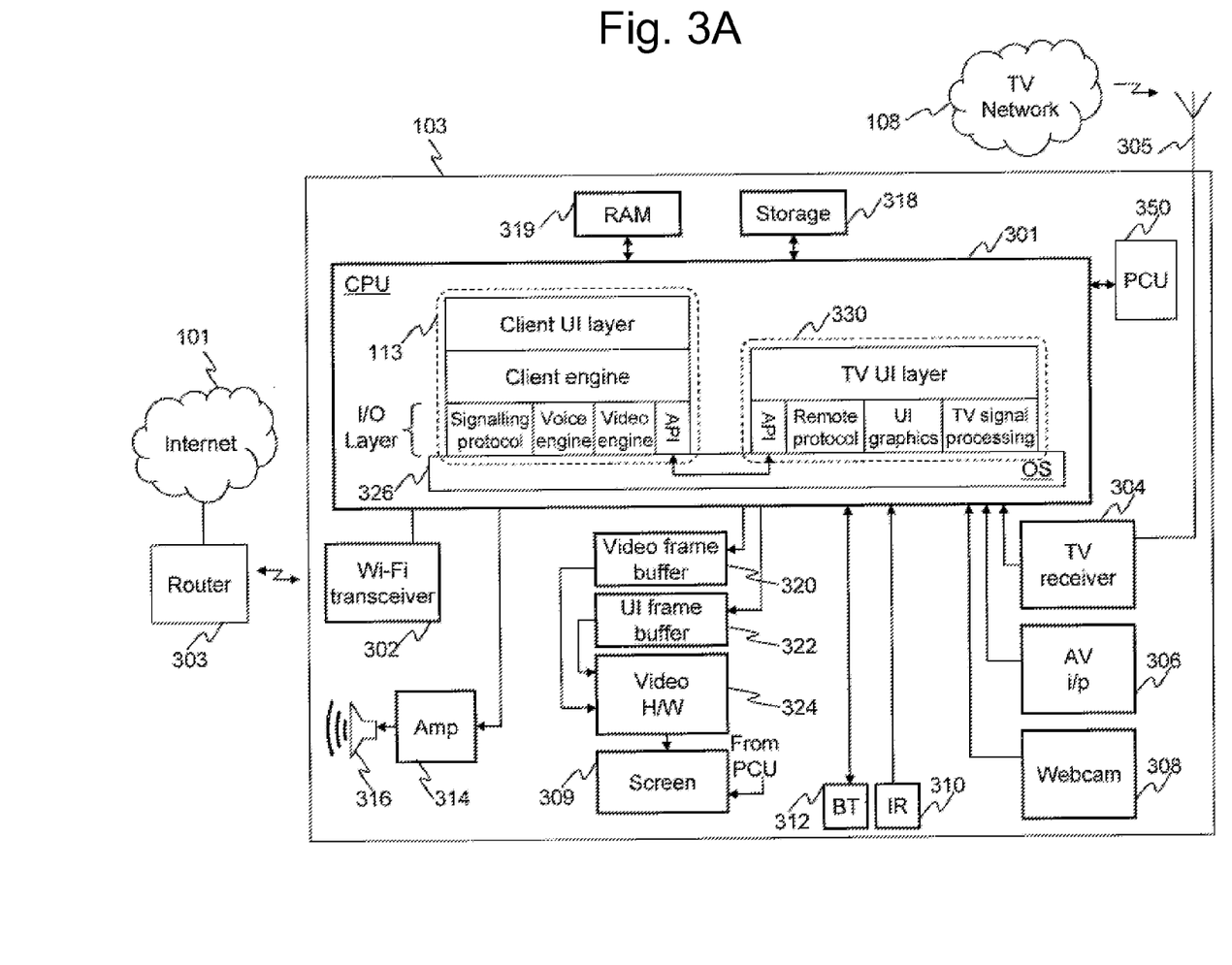
FIG. 3A is a schematic block diagram of a television set.

FIG. 3A is a schematic block diagram of a television set 103 according to an exemplary embodiment of the present invention. The television set 103 is a dedicated television unit in the sense that its primary purpose is as a television, and is designed to fulfil the role of a family or household television. However, at the same time it is additionally provided with secondary embedded functionality such as VoIP calling.

The televisions set 103 comprises, within a single casing: an embedded processing apparatus 301; a random access memory (RAM) 319; and an embedded non-volatile storage device 318 which may comprise an electronically erasable and reprogrammable memory (EEPROM or "flash" memory), a magnetic storage medium, and/or a one-time writable ROM. The non-volatile storage device 318 is coupled to the processing apparatus 301 and stores a basic operating system (OS) 326, a television application 330, and a communication client application 113 such as a VoIP client. The processing apparatus 301 is arranged to execute the operating system 326, e.g. either by fetching instructions directly from ROM or by first loading from a flash memory into the RAM 319 before fetching. When executed, the operating system 326 is configured to load the television application 330 and client application 113 into RAM 319 and schedule them for execution on the processing apparatus 301. The processing apparatus 301 is thus arranged to run the television application 330 and client application 113 under control of the operating system 326. In embodiments only a minimal operating system 326 may be required, in the form of a basic scheduler.

The television set 103 further comprises, within the same casing: a video frame buffer 320 and user interface (UI) frame buffer 322, video hardware 324, a screen 309, an amplifier 314 and speaker 316 or output to an external speaker or headphones, a television receiver 304, an external audio-video (AV) input 306 such as a SCART or HDMI input from an external source, a webcam or webcam input 308 for connecting to an external webcam, a network interface 302 in the form of a first short-range RF transceiver such as a Wi-Fi transceiver, a first remote interface 310 in the form of an infrared (IR) receiver, and a second remote interface in the form of a second short-range RF transceiver 312 such as a Bluetooth transceiver.

The video frame buffer 320 and user interface (UI) frame buffer 322 each have an input coupled to the processing apparatus 301. The video hardware 324 has an input coupled to the outputs of the video frame buffer 320 and UI frame buffer 322. The screen 309 has an input to the output of the video hardware 324. In embodiments, the frame buffers 320 and 322 could be dedicated hardware buffers or alternatively could be implemented in a general purpose memory. The amplifier 314 has an input coupled to the processing apparatus 301 and an output coupled to the speaker 316. The processing apparatus 301 is further coupled to the network interface 302, television receiver 304, auxiliary input 306, webcam input 308, infrared interface 310, and Bluetooth interface 312.

Any or all of the above components may be coupled to the processing apparatus 301 via intermediate components such as a bus and/or cache (not shown), as will be understood by a person skilled in the art.

The television receiver 304 comprises an input for connecting to at least one reception means such as an antenna, satellite dish or cable line, and is thus arranged to receive television broadcast signals from the television network 108 via the reception means. The television receiver 304 is a hardware front-end which may comprise for example: sampling circuitry, a low noise amplifier, a filter, a mixer, and/or an analogue-to-digital converter (ADC). Once received by the television receiver unit 304, the television signals are thus made available to the processing apparatus 301 for signal processing. The television application 330 comprises a signal processing engine in the form of code which, when executed, performs at least some of the required signal processing on the received television signals. The processed television signals are then output to the video frame buffer 320 and amplifier 314 for consumption by the end user. The signal processing engine may comprise for example: a digital filter, demodulator, demultiplexer, decoder, decryption block, and/or error checking block. However, different ways of allocating the television receiver and processing functionality between software and dedicated hardware are also possible. E.g. in embodiments, more of the functionality such as the demultiplexing could be moved to the receiver front-end 304. Techniques for receiving and processing television signals will be known to a person skilled in the art.

In the case of traditional analogue television broadcasts, the signals of a plurality of different concurrent programs (of different TV channels) are frequency-division multiplexed over the airwaves by being transmitted on different frequencies. The television receiver 304 will then comprise a tuning circuit to demultiplex the broadcasts and thereby separate out the signal of the required programme. In the case of digital television broadcasts, the signals of different concurrent programmes are each divided into packets and interleaved so as to time-division multiplex the different programmes' signals into a transport stream for broadcast. The signal processing engine of the television application 330 will then comprise a packet filter to demultiplex the packets of different transport streams and so separate out the signal of the required programme. Multiple transport streams may also be broadcast on different frequencies, requiring a tuner as well. Furthermore, for digital television, one or more of the transport streams may comprise additional programme information such as an electronic programme guide (EPG).

Video signals for output to the television screen 309 may also be received via the AV input 306 from an external source such as a DVD player or games console.

The television application 330 further comprises a UI graphics engine, a remote protocol engine, an application programming interface (API), and a television UI layer. The overall operation of the signal processing engine, UI graphics engine, remote protocol engine and API is controlled by the television UI layer. The user can select which broadcast to view by pressing buttons 205, 206, 208 on the remote control 114, causing the remote control 114 to communicate control signals to the processing apparatus 301 via the infrared transmitter 203 and receiver 310. The user may also use the buttons in a similar manner to view additional information such as the EPG or control menus, and to navigate the EPG or menus. The relevant control signals are interpreted by the remote protocol engine of the television application 113, which in turn communicates with the television UI layer. In response, the television UI layer controls the signal processing engine to output the relevant television programme to the video frame buffer 320, and/or controls the UI graphics engine to output graphics to the UI frame buffer 322 (e.g. to display the graphics of the menu or EPG). The frame buffers 320 and/or 322 supply their contents to the video hardware 324 for display on the screen 309. In embodiments the UI frame buffer 322 and video hardware 324 may be arranged to overlay UI graphics over the current television programme in a partially transparent manner, and/or to leave at least part of the television programme visible.

As mentioned, the television set 103 comprises a network interface 302. In preferred embodiments this takes the form of a wireless transceiver such as a Wi-Fi transceiver, for communicating wirelessly with a household or office-based wireless router 303 as found in most modern homes or offices. The router 303 in turn connects to the Internet 101. However, in alternative embodiments the network interface 302 may comprise other options such as a wired modem or a port to an external wired modem.

The communication client application 330 comprises a protocol stack having an I/O layer which, when executed on the processing unit 301, is operable to transmit and receive signals over the Internet 101 via the network interface 302. The I/O layer comprises a network signaling protocol for transmitting and receiving control signals over the Internet 101 via the network interface 302. The I/O layer may also comprise an API for communicating with the API of the television application 301.

The I/O layer further comprises a voice engine comprising a voice codec. The voice engine is arranged to accept speech signals from the microphone 201, and to encode those speech signals for transmission over the internet 101 via the network interface 302. The voice engine is also arranged to decode speech signals received over the Internet 101 via the network interface 302, for output to the television's amplifier 314 and speaker 316, or to the speaker 202 in the remote control 114 via the Bluetooth interfaces 312 and 204. The I/O layer further comprises a video engine comprising a video codec. The video engine is arranged to accept video signals from the webcam input 308, and to encode those video signals for transmission over the Internet 101 via the network interface 302. The video engine is also arranged to decode video signals received over the Internet 101 via the network interface 302, for output to the UI frame buffer 322, video hardware 326 and screen 309. Alternatively, in a full screen mode the video codec could output video via the video frame buffer 320.

Higher up the protocol stack, the client application 113 comprises a client engine which is responsible for call-set up. The client engine controls the network signaling protocol engine of the client 113 in order to establish a live voice or video call with another user terminal 102 or 103 over the Internet 101, preferably using P2P call set-up as discussed above, or potentially using a centralized call set-up via a server. The client engine may also handle other functions such as connection management, authentication, encryption, and/or exchanging presence information with the client applications 111 or 113 of other user terminals (presence information indicates the availability of a user for communication, and is preferably at least partially defined by the respective user themselves).

Even higher up the protocol stack, the client application 113 comprises a client UI layer which is responsible for the client's user interface. The client UI layer is operable to generate a client user interface for output to the UI frame buffer 322, video hardware 324 and screen 309. This may be output via the APIs and the UI graphics engine of the TV application 330 under control of the TV UI layer (or alternatively the client application 113 could be provided with its own UI graphics protocol to output graphics to the UI frame buffer 322 directly). The client user interface thus presents the user with on-screen controls which they can activate using buttons 206, 207, 208 on the remote control 114. Based on these button presses, the remote control 114 communicates control signals to the processing apparatus 301 via the infrared transmitter 203 and receiver 310. These control signals may be interpreted by the UI protocol engine in the television application 330 and then signaled via the APIs to the 110 layer of the client application 113 (or alternatively the I/O layer of the client application 113 could be provided with its own remote control protocol to interpret these control signals directly). In turn, the protocol of the I/O layer of the client 113 communicates with the client UI layer. The client UI layer is thus configured to respond to user inputs in order to control the overall operation of the client application 113, e.g. allowing a user to select contacts to call, hand up, etc.

Figure 4:
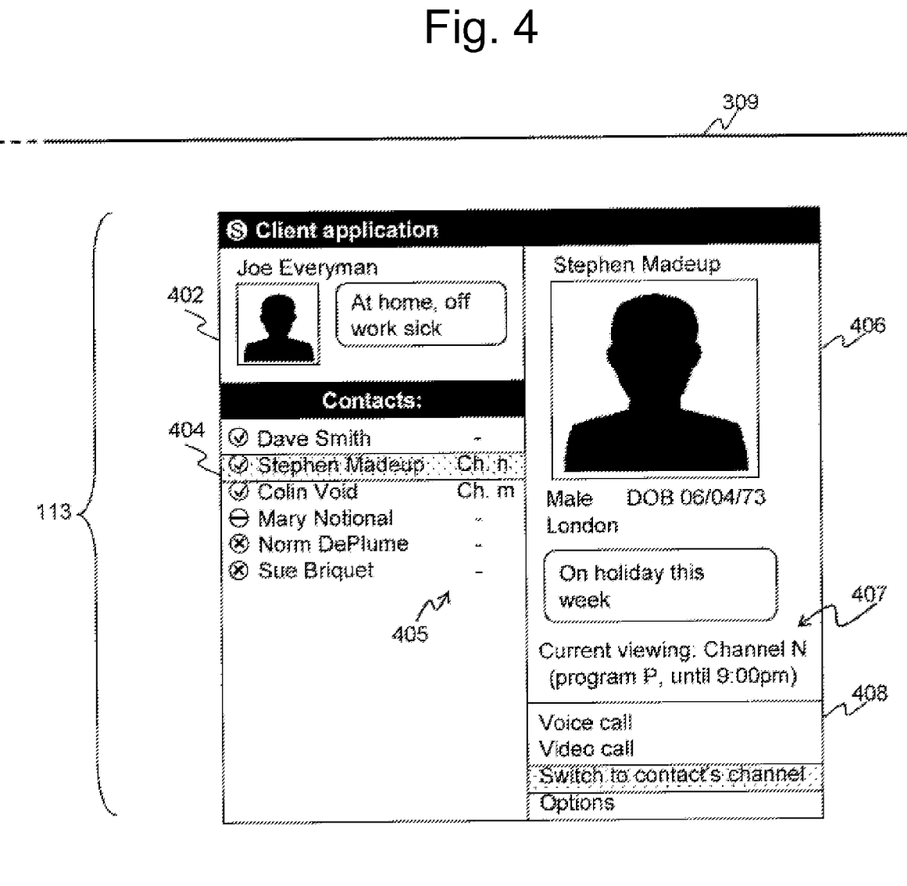
FIG. 4 is a schematic representation of a user interface

FIG. 4 illustrates an example user interface which could be displayed on the screen 309 by the client application 113, when summoned by the user using the relevant buttons of the remote 114. The user interface may be displayed only on part of the screen 309, allowing at least a portion of a currently viewed programme to remain visible; or may alternatively take up the whole screen 309. The displayed user interface comprises a number of panels. For example, the user interface may comprise a first panel 402 showing profile information of the user of the television 103 on which the client 113 is running E.g. the profile information may comprise the user's name, an "avatar image" (a picture which the user has chosen to represent themselves), and/or a "mood message" (a short user-defined statement for inclusion in their profile). Further, the user interface may comprise a second panel 404 showing a list of the user's contacts (preferably the client 113 is configured to only allow calls between users who have agreed to be contacts). Further, the user interface may comprise a third panel 406 showing a profile of a selected one of the contacts, and/or a fourth panel 408 providing a menu or other controls for selecting to call the selected contact.

Furthermore, the UI layer of the client 113 may be configured to communicate with the UI layer of the television application 330, via the APIs and the operating system 326. This allows the client application 113 and television application 330 to negotiate control of the screen 309 and/or speaker 316 or 202.

Whether the client application 113 or television application 330 takes precedence may depend on the implementation and/or situation. Since the television set 103 is primarily a television, then preferably the client application 113 should require permission from the television application 330 before controlling the screen 309 or speaker 316 or 202. However, in embodiments a user-defined setting may be provided allowing the user to control whether or not the client application 113 can autonomously take control of the screen 309 and/or speaker 316 or 202, e.g. to notify the user in event of an incoming call. This setting would preferably be stored in a non-volatile memory 318 and be readable by the client application 113 and/or television application 330. E.g. the television application 330 may be configured to read a setting from memory and, if set, to unequivocally allow the client application 113 to control the screen and/or speaker. Alternatively the client application 113 may be configured to read a setting from memory and, if set, to control the screen and/or speaker without seeking permission from the television application 330.

In the following described embodiments, the present invention provides a number of different mechanisms for sharing information on viewing activity between the television sets 103 and/or other television appliances such as set-top boxes, and for controlling operation of one of those television appliances in relation to another of the television appliances in dependence on the shared information. The shared information indicates a television channel currently being viewed.

Referring to FIGS. 1 and 4 by way of illustration, this viewing information is supplied over the Internet 101 to the client 113 running on a first television appliance 103a of one user, from the clients 113 running on one or more second television appliances 103b of contacts on a contact list 404 maintained by said user. Reciprocally, the client 113 on the first appliance 103a preferably supplies its own viewing information to the contacts' appliances 103b.

To this end, the client 113 running on each television appliance 103a, 103b generates a machine readable data item indicating the current television channel being viewed through that respective television appliance. That is to say, the data item is not just a text description, logo, or other indication having meaning only to a human; but rather a signal that can be interpreted and acted upon in an at least partially automated manner by the client application 113 running on the receiving appliances 103. A second television appliance 103b is thus enabled to provide a first television appliance 103a with information on the channel currently being viewed through the second television appliance 103b, and preferably vice versa. There are a number of mechanisms for exchanging the viewing information in the form of this machine-readable data item.

According to a first mechanism, the current viewing information may be exchanged over the Internet 101 in a manner akin to presence information in certain systems. In this first mechanism, the client 113 on each television appliance 103 maintains a contact list 404 and exchanges the viewing information directly with the other television appliances 103 of a plurality of contacts on the contact list 404, using the network addresses (IP addresses) of those contacts. This could be achieved for example by polling each contact's appliance 103 over the Internet 101 (e.g. periodically), and receiving an update of the viewing information from each respective contact in response. Alternatively or additionally, it could be achieved by each client 113 unilaterally transmitting its own viewing information to each contact over the Internet 101 (e.g. periodically, or in response to certain events such as the contact changing channel). For the purpose of this polling and/or transmission, the IP addresses of the contacts will be required by the client 113. In the case of a P2P system, the client 113 may determine the IP addresses of the contacts by reference to a distributed database distributed amongst other user's terminals 102, 103; or in the case of a non-P2P system the IP addresses may be determined by reference to a server 104.

According to a second mechanism, the current viewing information may be exchanged over the Internet 101 in manner akin to profile information in certain systems. In this second mechanism, the client 113 on each television appliance 103 maintains a contact list 404, and uploads its own respective viewing information to a server 104 (e.g. by periodically uploading updated information or doing so in response to certain events such as changing channel). Further, each client 113 also retrieves updates of a plurality of its contact's viewing information from the server 104 (e.g. again periodically).

According to a third mechanism, the current viewing information may be exchanged in a manner akin to network addresses in certain P2P systems. This third mechanism works as described in relation to the second mechanism, but with the viewing information being stored on and retrieved from a distributed database distributed amongst other user's terminals 102, 103 instead of a server 104.

Once a machine-readable data item indicating the viewing information has been received from a contact (by any of the above mechanisms), it has to be interpreted by the client 113 running on the receiving appliance 103a and (if appropriate) acted upon so as to control operation of the first appliance 103a in relation to the contact's appliance 103b. As mentioned, this action is at least partially automated, although in preferred embodiments there is also a stage of manual approval involved as well (i.e. the client 113 would preferably not allow a contact's viewing activity to have a completely autonomous effect).

Figure 5A:
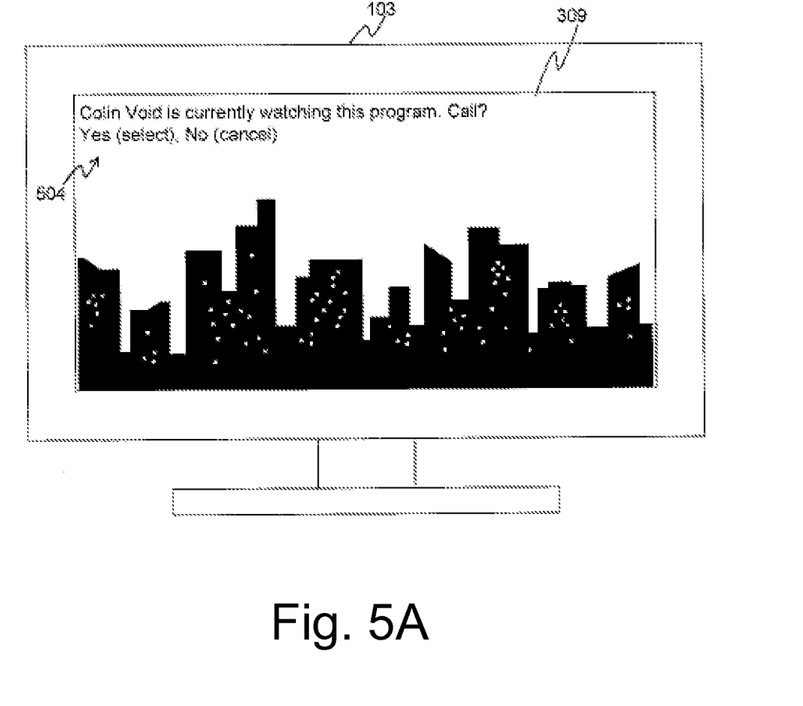
FIG. 5A is another schematic representation of a user interface.
Figure 5B:
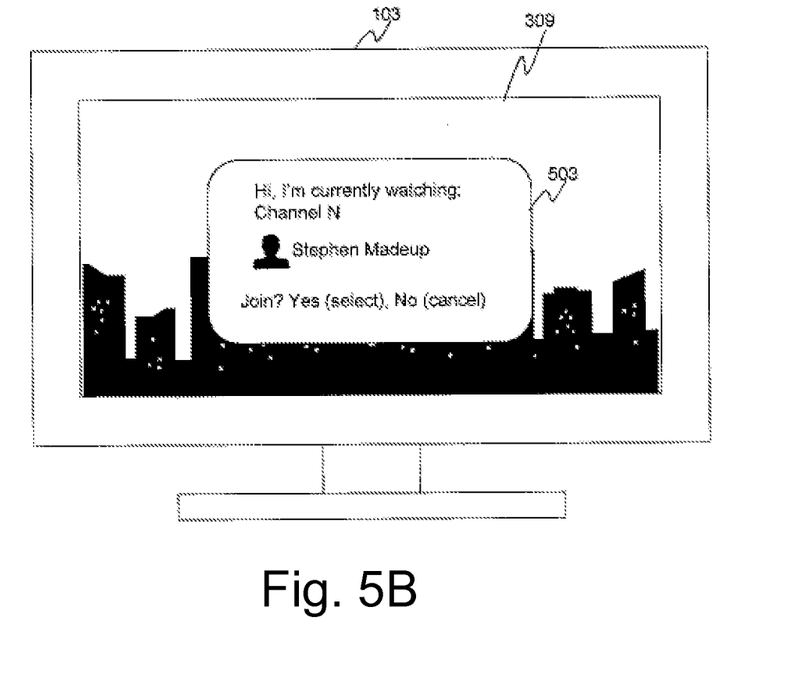
FIG. 5B is another schematic representation of a user interface.

As shown in the examples of FIGS. 4, 5A, and 5B, in embodiments this process may involve interpreting the machine-readable data so as to generate an onscreen control 405, 407, 503, 504 comprising human-readable data for output to the screen 309. The on-screen control then allows operation of the receiving user's appliance 103a to be controlled in relation to the contact's appliance 103b, subject to a suitable approval or selection from the user, based on the received machine-readable data item indicating the viewing activity of the contact. That is to say, the operation of the two appliances 103a, 103b is coordinated based on the exchanged data on viewing activity. This coordination can comprise one of at least two possibilities. A first type of coordination comprises detecting when the user and one or more of his or her contacts are viewing the same channel, and enabling a communication session such as a voice or windowed video call to be established based on the detection. A second type of coordination comprises enabling a user to switch channel to the channel currently being viewed by a contact based on the received viewing information.

A preferred example of the first type of coordination between television appliances 103a and 103b is described in relation to FIG. 5A. Here, a machine-readable data item is received from each client on each of a plurality of contact's television appliances 103b indicating their viewing activity, e.g. being polled periodically by the first, receiving television appliance 103a. The client on the receiving appliance 103a processes each machine-readable data item in order to compare the television channel currently being viewed by each of the contacts through their respective appliances 103b with the television channel currently being viewed by the user of the receiving appliance 103a. On condition that a match is found, and if the feature is not disabled by a user setting, then the client on the receiving appliance 103a displays an on-screen control in the form of a prompt 504 on the screen 309; e.g. comprising human-readable message indicating information such as the identity of the matched contact, the channel and/or programme that contact is currently viewing, a proposal that the user establishes a call with the contact, and an indication of an action the user may take to accept or decline the proposal (e.g. by pressing buttons 207 or 208 on the remote 114). The client 113 thus provides an on-screen control enabling a call to be established with the contact based on receipt of the received machine-readable data item indicating the viewing activity of that contact.

Note that the establishment of the call is partially automated based on the machine-readable data item indicating the contact's viewing activity, in that the prompt 504 is generated automatically in response to detecting matching viewing activity and the call is established in response to that prompt; rather than the user simply choosing to call the contact by navigating conventional controls. The prompt 504 may be displayed in conjunction with the ongoing programme, e.g. being overlaid.

Examples of the second type of coordination between television appliances 103a and 103b are described in relation to FIGS. 4 and 5B. For example in FIG. 4 an indication 405 may be displayed against each contact in the contact list 404 indicating the current channel they are watching, and/or a message 407 may be displayed in the profile information of a particular contact indicating the channel or programme being viewed by that contact. In conjunction with an input means such as a cursor system controlled by function buttons 207 or 208 on the remote control 114, these indications or messages 405, 407 provide another type of onscreen control that can be generated by the client 113 based on receiving a machine readable-data item indicating the viewing activity of one or more contacts. In this example, the user can switch to the same television channel as currently being viewed by one of his or her contacts by operating the cursor system to select the appropriate on-screen control 405, 407. If the user does so, the client 113 issues a control signal to the television application 330 to change to the same channel as the contact.

Note that the switching of the channel is partially automated based on the machine-readable data item indicating the contact's viewing activity, in that the on-screen control 405, 407 is generated automatically based on the machine-readable data item and the switching operation is performed by the client 113 using information in or derived from the machine-readable data item received from the contact; rather than the user simply choosing to navigate to the contact's channel via conventional channel-changing controls such as alphanumeric buttons 206 or channel "up" and "down" buttons on the remote 114.

In another example shown in FIG. 5B, the machine-readable data item indicating the contact's viewing is transmitted as part of an invitation message from the contact's appliance 103b, initiated by the contact. The invitation message is to invite the user of the receiving appliance 103a to automatically switch to the same television channel as the contact. In response, the client on the receiving appliance 103a displays an on-screen control in the form of a prompt 503, which may indicate information such as the nature of the invitation, the identity of the contact, and an action the user may take to accept or decline the invitation (e.g. using the remote control 114). If the user accepts, the client 113 issues a control message to the television application 330 to change to the same channel as the contact.

In the examples of FIGS. 4, 5A, and 5B, the client 113 on the first, receiving appliance 103a interprets the machine-readable data item in order to generate human-readable information, and/or to identify a channel to switch to. One way to do this would be simply to assign predetermined channel identities pre-stored at each television appliance 103. However this would be inflexible as it would not accommodate the possibility of updates to channel identities, and would not incorporate other information such as programme or timing information. A preferred option is to use additional information received in the television broadcast itself in order to interpret the machine-readable data item, as now discussed in relation to FIG. 6.

Figure 6:
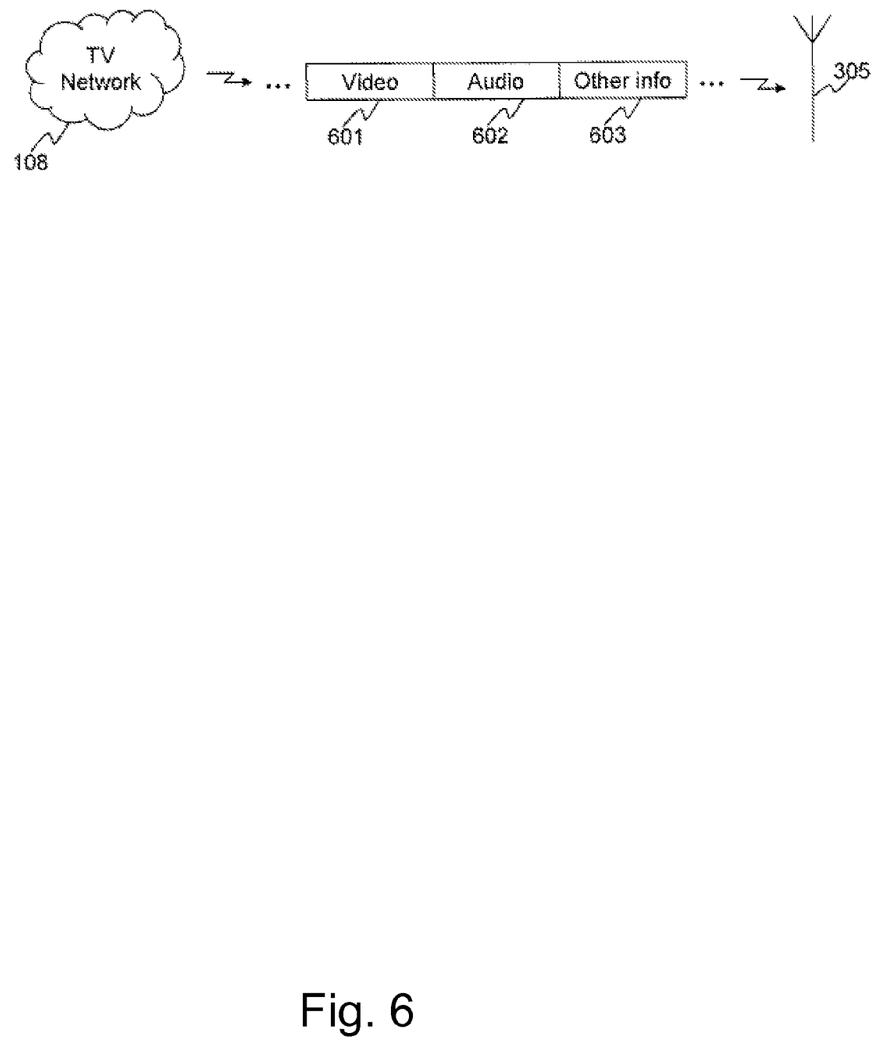
FIG. 6 schematically illustrates transmission of a transport stream.

In most digital television systems, additional programme information is broadcast over the television network 108. In this case the additional programme information is received by the client application 113 via the television receiver 308. The additional information may comprise channel identities, programme identities, and/or timing information, for example in the form of an electronic programme guide (EPG). In particularly preferred embodiments of the present invention, the client application 113 is configured to access this additional information via an API to the television application 33a.

Referring to FIG. 6, a digital television broadcast may comprise audio data 601 and video data 602 of one or more programme streams all interleaved together (i.e. time-division multiplexed) into a combined transport stream for transmission on a particular frequency. Also interleaved into the transport stream is additional information 603 providing channel identities, programme identities and/or programme schedules for the one or more programmes (potentially amongst other information such as subtitles and textual programme summaries or précis). In one embodiment this additional information 603 may comprise an electronic programme guide (EPG). The additional information 603 may take the form of a general data stream multiplexed into the transport stream in conjunction with a plurality of programme streams, providing programme information for a plurality of programmes. An example of this would be an electronic programme guide (EPG). Alternatively or additionally, individual respective programme information may be provided in the stream of each programme. The audio data 601, video data 602 and additional information 603 are decoded by the signal processing engine of the television application 331, and the required channel and/or programme information 603 can be accessed by the client application 113 via the APIs under control of the TV UI layer.

In such embodiments, the client 113 takes the received machine-readable data item indicating a television channel currently being viewed by a contact, and processes the received data item by mapping it to additional information 603 received via the television broadcast. The client 113 can thereby determine the identity of a current channel being viewed by the contacts, the identity of a current programme being viewed by a contact, and/or the timing of the contact's current programme In the example of FIG. 5A the channel identity, programme identity and/or timing information obtained from the additional information 603 is displayed as part of the on-screen prompt 504. These will aid the user in making an appropriate decision as to whether to establish a call.

In the examples of FIGS. 4 and 5B, the channel identity, programme identity and/or timing information obtained from the additional information 603 is displayed as part of the on-screen control 405, 407 and/or 503. These will aid the user in making an appropriate selection. Furthermore, if the user selects or accept the proposed channel switch, then the mapped channel identity may be used to switch the channel. E.g. different channels may map to different channel numbers or broadcast frequencies in different geographical regions, such that the machine-readable data item received from a contact cannot directly indicate the channel number or frequency that the receiving appliance 103a should switch to. Instead, the received data item may provide some other means of specifying the channel, which is mapped to an appropriate channel number or frequency received in the additional broadcast information 603.

It will be appreciated that the above embodiments have been described only by way of example.

For instance, the term "application" as used herein is not limiting to any one discrete or indivisibly executable software unit, but more generally can refer to any one or more portions of code which operate together to provide the relevant functionality. E.g. the communication client application could comprise a basic client application and separate plug-in application, and/or some of the described functionality of the client application could be incorporated into a portion of code that bay be referred as being part of the television application 330.

Further, where it is said that the communication client processes the machine-readable data item in order to generate human-readable information, this does not necessarily mean readable in the sense of text. The human readable information could comprise an icon or logo for example which has meaning to the user.

Note also that the term "programme" does not limit to any particular kind of programme content, and could refer for example to a film, soap opera, documentary, sporting event, news programme, etc.

Further, other ways of allocating the various client, television and other functionality amongst different processors are envisaged. For example, one or more dedicated signal processors (DSPs) could be arranged to execute the television signal processing engine of the television application 330 and/or the video engine and/or voice engine of the client application 113; with one or more separate CPUs being arranged to execute the UI layer, client engine, protocol and graphics engines of the client application 113 and/or the UI layer and protocol and graphics engines of the television application 330. In another example, the client application and television application would each be run on a different respective CPU embedded in the television set 103. Some or all of the functionality of the television application 330 could alternatively be implemented in dedicated hardware, including the possibility of hardwired signal processing apparatus in the television receiver front-end 304.

Further, where a server 104 is referred to above, this does not necessarily limit to a single server unit, and generally the server 104 can be implemented in one or more server units at one or more server locations.

Furthermore, although the preferred application, the invention is not limited to use in a television set having the above components including television screen all within one single self-contained casing. In another application, the invention could be implemented in a set-top box for plugging into such a television set. In that case the diagram would be similar to that of FIG. 3A but with the television hardware 320, 322, 324 and screen 309 replaced by an audio-video (A V) output.

Figure 3B:
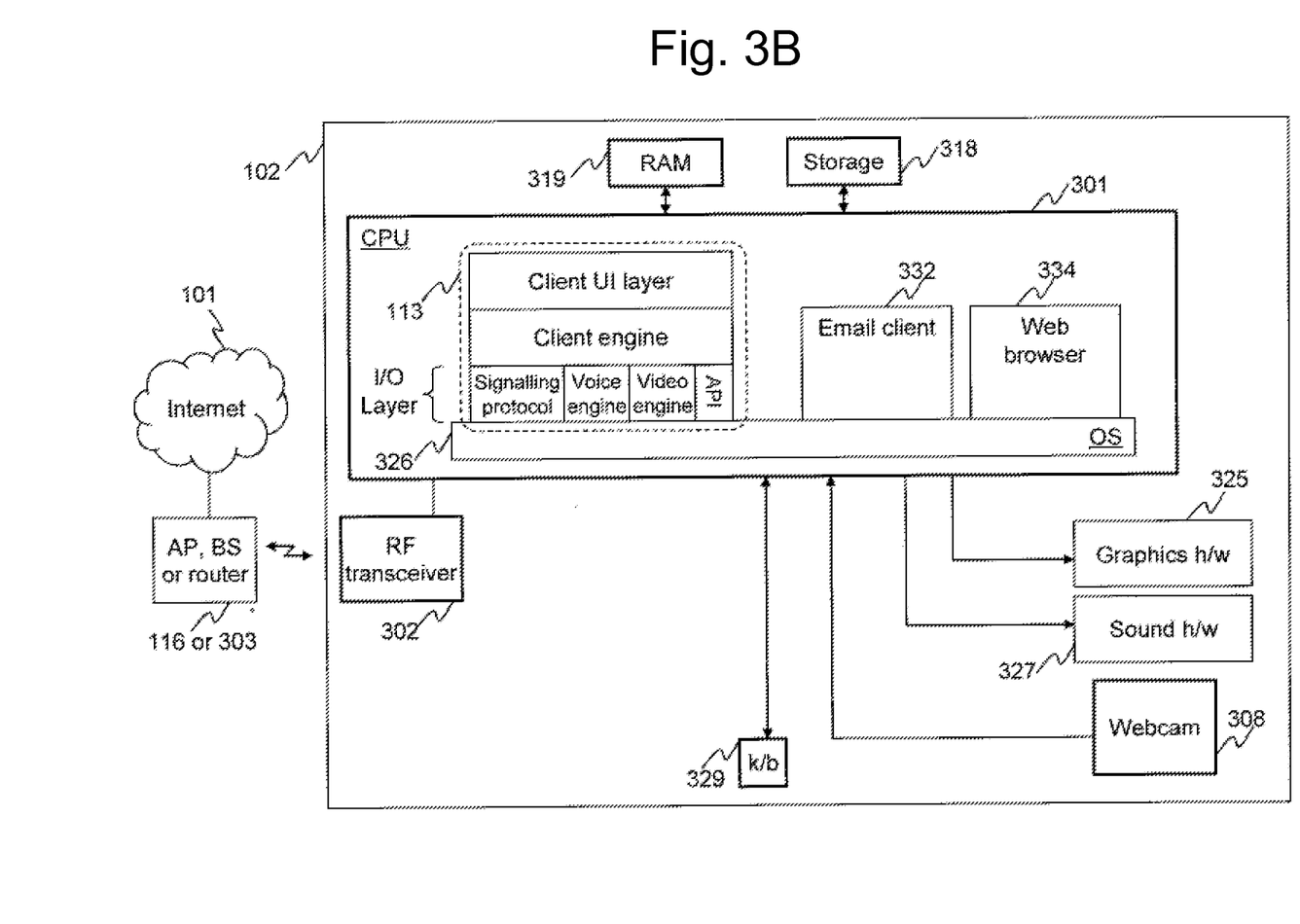
FIG. 3B is a schematic block diagram of a television set.

Generally speaking the present invention can be applied to any media appliance having video apparatus for outputting signals to a television screen. The video apparatus may comprise any combination of dedicated hardware and/or regions of memory storing software modules, with any software modules being executed on either the same or a different processor unit as the client application 103. Depending on the appliance and the implementation, the video apparatus may take different forms. In the example television set of FIG. 3A for example, the video apparatus may be said to comprise a combination of the frame buffers 320 and 322, video hardware 324, and/or a region of the non-volatile memory 318 storing signal processing code of the television application. In the example computer terminal 102 of FIG. 3B, the video apparatus may be said to comprise the video hardware 325, and/or a region of the non-volatile storage 318 storing code for displaying graphics.

Further, the present invention need not be limited by television broadcasts. With increasing popularity of packet-based television services, there may be interest in the idea of a dedicated television set with the capability of receiving packet-based television signals, either over the Internet or a dedicated packet-based service.

Furthermore, note that the present invention is not limited particularly to VoIP or to a peer-to-peer topology. Other packet-based networks, protocols and methods of call set-up may also be used.

The established communication may be voice or video, but it may alternatively be an IM chat message or session, or other type of communication. E.g. one scenario may be that a user could join or start a multi-chat directly connected to a specific show, with some of the user's contacts. This would allow the user to engage in an IM chat session related to the show, which would require less engagement from the user compared to a video or voice call.

Other variations of the present invention may be apparent to a person skilled in the art given the disclosure herein. The scope of the present invention is not limited by the described embodiments, but only by the appendant claims.

What is claimed is:

1. A computer-implemented method comprising:
 detecting a television channel being output via a television appliance;
 displaying, in a graphical user interface (GUI), an indication of a current on-screen viewing activity of a contact's television appliance, the current on-screen viewing activity of the contact's television appliance including different content than the television channel; and
 displaying, in the GUI, a control that is selectable to cause automatic switching from the television channel to a different television channel associated with the current on-screen viewing activity of the contact's television appliance.

2. The computer-implemented method of claim 1, further comprising:
 displaying, in the GUI, a different control being selectable to establish a communication event with the contact's television appliance; and
 in response to receiving a selection of the different control, establishing the communication event with the contact's television appliance.

3. The computer-implemented method of claim 2, wherein said communication event comprises one or more of a voice call, a video call, or an instant messaging event.

4. The method of claim 1, further comprising:
 maintaining a list of contacts including the contact;
 receiving a plurality of machine-readable data items from the contacts' respective television appliances;
 processing the machine-readable data items so as to extract the current on-screen viewing activities of the respective contacts' television appliances; and
 displaying, in the GUI, visual indications of the respective contacts and the current on-screen viewing activities of the respective contacts' television appliances.

5. The computer-implemented method of claim 4, further comprising:
 receiving one or more of programme data or channel identity data; and
 processing the machine-readable data items by mapping the current on-screen viewing activities of the respective contacts' television appliances to one or more of a particular programme or a particular channel identity.

6. The computer-implemented method of claim 4, further comprising:
 receiving programme timing data; and
 processing the machine-readable data items by mapping the current on-screen viewing activities of the respective contacts' television appliances to the programme timing data.

7. The computer-implemented method of claim 1, further comprising, in response to receiving a selection of the control, automatically switching to the current on-screen viewing activity of the contact's television appliance.

8. The computer-implemented method of claim 1, further comprising, in response to receiving an indication of a selection of a button on a remote control, displaying the GUI.

9. The computer-implemented method of claim 1, further comprising:
 displaying the GUI on less than a whole screen of the television appliance such that a portion of the content from the television channel remains visible.

10. The computer-implemented method of claim 1, further comprising displaying the GUI on a whole screen of the television appliance.

11. The computer-implemented method of claim 1, wherein the GUI further comprises a first panel showing profile information for a user of the television appliance, including one or more of a user name, an avatar, and a mood message.

12. An apparatus comprising:
 one or more processors;
 a client stored on the apparatus and executable by the one or more processors to:
 detect a television channel being output via a television appliance;
 display, in a graphical user interface (GUI), an indication of a current on-screen viewing activity of a contact, the current on-screen viewing activity of the contact including different content than the television channel; and
 display, in the GUI, a control that is selectable to cause automatic switching from the television channel to a different television channel associated with the current on-screen viewing activity of the contact.

13. The apparatus of claim 12, wherein the client is further executable by the one or more processors to:
 display, in the GUI, a different control that is selectable to establish a communication event with the contact's television appliance; and
 in response to receiving a selection of the different control, establish the communication event with the contact's television appliance.

14. The apparatus claim 12, wherein the client is further executable by the one or more processors to:
- maintain a list of contacts including the contact;
- receive a plurality of machine-readable data items from the contacts' television appliances;
- process the machine-readable data items so as to extract the current on-screen viewing activities of the respective contacts' television appliances; and
- display, in the GUI, visual indications of the respective contacts and the current on-screen viewing activities of the respective contacts' television appliances.

15. The apparatus of claim 14, wherein the client is further executable by the one or more processors to:
- receive one or more of programme data or channel identity data; and
- process the machine-readable data items by mapping the current on-screen viewing activity of the respective contacts' television appliances to one or more of a particular programme or a particular channel identity.

16. The apparatus of claim 14, wherein the client is further executable by the one or more processors to:
- receive programme timing data; and
- process the machine-readable data items by mapping the current on-screen viewing activities of the respective contacts' television appliances to the programme timing data.

17. The apparatus of claim 12, wherein the client is further executable by the one or more processors to, in response to receiving a selection of the control, automatically switch to the current on-screen viewing activity of the contact's television appliance.

18. A media appliance comprising:
- one or more processors;
- a memory storing instructions that are executable by the one or more processors to cause the media appliance to perform operations including:
  - detecting an on-screen viewing activity of the media appliance;
  - displaying, in a graphical user interface (GUI), an indication of a current on-screen viewing activity of a contact's television appliance, the current on-screen viewing activity of the contact's television appliance including different content than the on-screen viewing activity for the media appliance;
  - displaying, m the GUI, a control that is selectable to cause automatic switching from the on-screen viewing activity for the media appliance to a same on-screen viewing activity as the current on-screen viewing activity of the contact's television appliance; and
  - in response to receiving a selection of the control, automatically switching to the same on-screen viewing activity being displayed by the contact's television appliance.

19. The media appliance of claim 18, wherein the operations further comprise:
- maintaining a list of contacts including the contact;
- receiving a plurality of machine-readable data items from the contacts' television appliances;
- processing the machine-readable data items so as to extract the current on-screen viewing activities of the respective contacts' television appliances; and
- displaying, in the GUI, visual indications of the respective contacts and respective on-screen viewing activities of the respective contacts' television appliances.

20. The media appliance of claim 18, wherein the operations further comprise:
- displaying, in the GUI, a different control that is selectable to establish a communication event with the contact's television appliance; and
- in response to receiving a selection of the different control, establishing the communication event with the contact's television appliance.

\* \* \* \* \*